United States Patent [19]

Tsuno

[11] Patent Number: 5,731,395
[45] Date of Patent: Mar. 24, 1998

[54] FUNCTIONAL GROUP-CONTAINING POROUS RESIN AND A PROCESS FOR ITS PREPARATION

[75] Inventor: Takaharu Tsuno, Tsukuba, Japan

[73] Assignee: Arakawa Chemical Industries, Ltd., Osaka, Japan

[21] Appl. No.: 737,506
[22] PCT Filed: Mar. 6, 1996
[86] PCT No.: PCT/JP96/00545
    § 371 Date: Nov. 13, 1996
    § 102(e) Date: Nov. 13, 1996
[87] PCT Pub. No.: WO96/28484
    PCT Pub. Date: Sep. 19, 1996

[30] Foreign Application Priority Data

Mar. 14, 1995 [JP] Japan ................... 7-053923
Mar. 24, 1995 [JP] Japan ................... 7-91797
Sep. 29, 1995 [JP] Japan ................... 7-276481

[51] Int. Cl.$^6$ .......... C08F 212/36; C08F 212/12; C08F 2/18
[52] U.S. Cl. .......... 526/334; 526/206; 526/207; 526/210; 526/212; 526/219.6; 526/292.9; 526/336; 521/147
[58] Field of Search .......... 526/292.9, 334, 526/210, 212, 219.6, 347, 247, 206, 207, 336; 521/147

[56] References Cited

U.S. PATENT DOCUMENTS

| | | | |
|---|---|---|---|
| 3,041,319 | 6/1962 | Abramo | 526/334 X |
| 3,079,369 | 2/1963 | Abramo | 526/334 |
| 3,190,926 | 6/1965 | Stowe | 526/334 X |
| 5,244,926 | 9/1993 | Harris et al. | 526/334 X |

FOREIGN PATENT DOCUMENTS 7-289919  11/1995  Japan.
7-291882  11/1995  Japan.

OTHER PUBLICATIONS

Shim, Jae Hu et al; "Polymer–Supported Crown Ethers. 5. Syntheses of Lariat Azacrown Ethers", Pollimo, vol. 16, No. 3, (1992) (S. Korea), pp. 285–290.

*Primary Examiner*—Fred Teskin
*Attorney, Agent, or Firm*—Armstrong, Westerman Hattori, McLeland & Naughton

[57] ABSTRACT

A functional group-containing porous resin prepared by polymerization of a monomer mixture of, based on 100% by weight of the total amount of the monomers, 15 to 97% by weight of divinylbenzene, 0 to 82% by weight of at least one aromatic monovinyl monomer selected from the group consisting of styrene, methylstyrene and ethylvinylbenzene and 3 to 30% by weight of a vinylbenzyloxyalkyl derivative represented by the formula

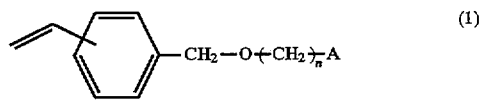

(1)

wherein n is an integer of 2 to 16 and A represents a hydroxyl group or a halogen atom, and a process for preparing the same. The above-mentioned porous resin of the invention can fully exhibit its function due to the marked presence of a functional group on the surface of the resin and/or in the neighborhood thereof.

10 Claims, No Drawings

FUNCTIONAL GROUP-CONTAINING POROUS RESIN AND A PROCESS FOR ITS PREPARATION

FIELD OF THE INVENTION

The present invention relates to a novel functional group-containing porous resin and a process for preparing the same.

BACKGROUND ART

Porous materials, because of their structural characteristics and chemical properties, have been heretofore researched, developed and used in various fields for various applications as packing for analytical or preparative columns, supports for enzymes or catalysts, supports for adsorption of useful substances and so on. Typical examples are inorganic materials such as porous silica gel and alumina, and synthetic high molecular weight materials such as divinylbenzene-styrene porous resins and divinylbenzene-methacrylic acid porous resins.

Silica gel, which has high mechanical strength, is widely used as column packings and catalyst supports by itself or in the form as modified with various functional groups or functional substances utilizing a silanol group on its surface. However, silica gel has problems associated with its inherent chemical stability, namely a low stability in a basic medium or the influence of residual silanol group [cf., e.g. J. Chromatogr. Sci., vol.22, p.386 (1984) and J. Chromatogr. vol.149, p.199 (1978)].

On the other hand, conventional processes for preparing divinylbenzene-styrene porous resins have been long known. For example, according to a known process, a divinylbenzene-styrene monomer mixture is mixed with an organic solvent, and the obtained solution is subjected in water to suspension polymerization using a radical polymerization initiator, the organic solvent being what is called a porogen which does not participate in polymerization and which is sparingly soluble in water, the monomer mixture being soluble in said organic solvent but the resulting copolymer being insoluble in said solvent [cf., e.g. J. Appl. Polym. Sci., vol.26, p.3205 (1981) and Anal. Chem., vol.52, p.2425 (1980)]. Generally this type of porous resin prepared by suspension polymerization is of the order of μm to mm units in the diameter of apparent particles (hereinafter referred to as "secondary particles"), and, when externally or internally observed under an electron microscope, is seen to be a firm agglomerate of finer particles having a size of the order of nm unit (hereinafter referred to as "primary particles"). Stated more specifically, the interstices between agglomerated primary particles are hollows occupied by the organic solvent during the polymerization. The primary particles, being highly crosslinked resins, are insoluble in most of organic solvents and are basically substantially free from swelling. The porous resins prepared by this process have a large specific surface area, a high mechanical strength and a high chemical stability and, therefore, find wide applications as supports and as column packings for analytical or preparative purposes.

Divinylbenzene-styrene porous resins can be imparted new functions by chemical modification or due to the presence of a functional group-containing monomer (so-called functional monomer) on the surface of primary particles and/or in the neighborhood thereof, making good use of the superior mechanical strength and the high chemical stability of the constituent base resin. Thus, those resins have attracted great attention as the so-called functional porous resins in a wide variety of applications. Fundamentally two methods are known for giving new functions to the porous resin: (i) a method in which various functional groups or functional substances are chemically attachd to the synthesized divinylbenzene-styrene porous resin using the aromatic ring or the remaining vinyl group of the porous resin; and (ii) a method in which a mixture of a divinylbenzene-styrene monomer and a functional monomer is polymerized. The method (i), however, suffers various drawbacks. For example, because the chemical reaction proceeds essentially between the solid and the liquid, the reaction often requires rigorous reaction conditions and results in an extremely low conversion. Further, secondary particles may be deformed during the reaction. The method (ii) is also defective as follows. The method (ii) has difficulty in effectively arranging or orientating the functional monomer on the surface of primary particles and/or in the neighborhood thereof. In most cases the functional monomer is present for the most part inside a region of the monomer mixture and consequently the functional group is embedded deep into the highly crosslinked resin, failing to fully accomplish its function.

DISCLOSURE OF THE INVENTION

An object of the present invention is to provide a novel functional group-containing porous resin free of the foregoing prior art drawbacks and a process for preparing the same.

Another object of the invention is to provide a novel functional group-containing porous resin which can fully accomplish its function due to prominent presence of the functional group on the surface of primary particles and/or in the neighborhood thereof and a process for preparing the same.

Other objects and features of the invention will become apparent from the following description.

According to the present invention, there is provided a functional group-containing porous resin prepared by polymerization of a monomer mixture of; based on 100% by weight of the total amount of the monomers, 15 to 97% by weight of divinylbenzene, 0 to 82% by weight of at least one aromatic monovinyl monomer selected from the group consisting of styrene, methylstyrene and ethylvinylbenzene and 3 to 30% by weight of a vinylbenzyloxyalkyl derivative represented by the formula

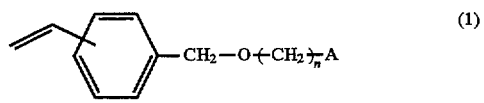

wherein n is an integer of 2 to 16 and A represents a hydroxyl group or a halogen atom.

The present invention also provides a process for preparing said functional group-containing porous resin, the process comprising the steps of mixing a monomer mixture of divinylbenzene, at least one aromatic monovinyl monomer selected from the group consisting of styrene, methylstyrene and ethylvinylbenzene and a vinylbenzyloxyalkyl derivative of the formula (1) with an organic solvent which does not participate in polymerization and which is sparingly soluble in water, said monomer mixture being soluble in said organic solvent but the resulting copolymer being insoluble in said solvent; and subjecting the obtained solution in an aqueous medium to suspension polymerization using a radical polymerization initiator.

The present inventor conducted extensive research to overcome the drawbacks of the above-mentioned conventional producing processes in view of the importance in the development of technologies for functional porous resins, particularly paying his attention to the problem on the arrangement and orientation of the functional monomer on the surface of primary particles in the method (ii). His findings are as follows. The vinylbenzyloxy-alkyl derivative of the formula (1) is a functional group-containing monomer having or partially having a high affinity for or a high interaction with the organic solvent, more specifically a porogen. Since said monomer is used as the functional monomer in the suspension polymerization of the monomer mixture, the monomer is caused to preferentially exist in the vicinity of an interface between a region of "polymer+ monomer" and a region of "the organic solvent" during polymerization so that the functional group derived from said monomer is arranged and orientated on the surface of primary particles and/or in the neighborhood thereof. The present invention was completed based on these novel findings.

The present invention provides a functional group-containing porous resin which is a divinylbenzene-styrene porous resin wherein a hydroxyl group or a halogen group derived from the structural units represented by the formula

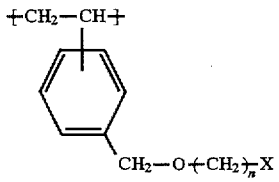

(2)

wherein n is an integer of 2 to 16 and X represents a halogen atom is efficiently arranged and orientated as a functional group on the surface of primary particles and/or in the neighborhood thereof, and an expedient process for preparing the same.

Described below in detail are the raw materials and polymerization procedure in the process for preparing the functional group-containing porous resin according to the present invention.

The divinylbenzene to be used in the polymerization of the present invention includes commercially available products having a purity of about 50 to about 60%. These commerical products can be used as such or as purified by distillation. The commercial product contains about 50 to about 40% of ethylvinylbenzene as a main impurity. Of course, a high-purity commercial product if available can be used without a problem. In this connection, it is noted that the monomer mixture essentially contains divinylbenzene in an amount of 15 to 97% by weight based on the total weight of the monomers used. The divinylbenzene which can be used in the present invention includes mainly meta-isomer and para-isomer and may be a mixture of these isomers or one of them.

The styrene, methylstyrene and ethylvinylbenzene to be used as the aromatic monovinyl monomer in the present invention include commercially available products, and these commercial products can be used as such or as purified by distillation. The methylstyrene which can be used in the invention includes meta-isomer, para-isomer, α-isomer and β-isomer and may be a mixture of these isomers or one of them. Of these methylstyrene species, the meta-isomer and para-isomer are also called vinyltoluene. The ethylvinylbenzene which can be used in the invention includes meta-isomer and para-isomer and may be a mixture of these isomers or one of them. Since a specified amount of ethylvinylbenzene is contained in a commercial divinylbenzene, the commercial divinylbenzene is usually used as it is. However, ethylvinylbenzene if commercially available may be added, of course.

The vinylbenzyloxyalkyl derivative of the formula (1) may be a mixture of meta-isomer and para-isomer or one of them. In the formula (1), n is an integer of 2 to 16, preferably an integer of 4 to 12. When n is less than 2, the derivative is impaired in the behavior of arranging and orientating the functional group on the surface of the resin. When n is more than 16, the polymerization rate is decreased and the specific surface area is reduced in the obtained resin. Thus, the derivative wherein n is outside said range is undesirable. The halogen atoms represented by A in the formula (1) are fluorine, bromine, chlorine and iodine. The hydrocarbon moiety in said derivative acts as the so-called spacer and plays an important role in an affinity for and an interaction with hydrocarbon solvents, aliphatic alcohol solvents or aliphatic alkyl halide solvents.

The vinylbenzyloxyalkyl derivative of the formula (1) wherein A is a hydroxyl group, namely a vinylbenzyloxyalkanol derivative, can be prepared by a conventional process [cf., e.g. J. Am. Chem. Soc., vol.112, p.6723 (1990)].

The vinylbenzyloxyalkanol derivative can be obtained by treating an alkyldiol represented by the formula

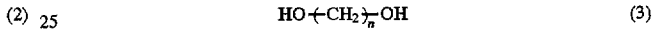

$HO(CH_2)_n OH$ (3)

wherein n is an integer of 2 to 16 with sodium hydride to give alkoxide and reacting the alkoxide with vinylbenzyl chloride. In the reaction, the reaction selectivity for producing the desired product can be increased by suitably selecting the molar ratio of alkyldiol, sodium hydride and vinylbenzyl chloride to be used. The vinylbenzyl chloride which is used herein is usually available as a mixture of meta-isomer and para-isomer. Such mixture can be used as such without a problem in the present invention. of course, meta-isomer and para-isomer may be individually used.

The vinylbenzyloxyalkyl derivative of the formula (1) wherein A is a halogen atom, namely a vinylbenzyloxyalkyl halide derivative, can be prepared, for example, by halogenating the alcohol moiety of said vinylbenzyloxyalkanol derivative using a halogenating reagent. Examples of useful halogenating reagents are $PBr_3$, $PBr_5$, $SOBr_2$, etc. for bromination and $PCl_3$, $PCl_5$, $SOCl_2$, $POCl_3$, etc. for chlorination.

The mixing ratio of the monomers to be used in the invention is as follows. Use is made of, based on 100% by weight of the total amount of the monomers, 15 to 97% by weight of divinylbenzene, 0 to 82% by weight of at least one aromatic monovinyl monomer selected from the group consisting of styrene, methylstyrene and ethylvinylbenzene and 3 to 30% by weight of the vinylbenzyloxyalkyl derivative represented by the formula (1). A suitable mixing ratio can be selected from said ranges according to the purpose of the porous resin to be produced. If the proportion of the divinylbenzene is less than 15% by weight, the specific surface area of the obtained resin is reduced. Hence said proportion is undesirable. If the proportion of the vinylbenzyloxyalkyl derivative is more than 30% by weight, the polymerization rate is lowered and the specific surface area of the obtained resin is reduced. Hence said proportion is undesirable. The proportion of less than 3% by weight significantly decreases the amount of the hydroxyl or halogen group as a functional group which exists on the surface of the resin and/or in the neighborhood thereof, consequently failing to provide the contemplated functional group-containing porous resin.

According to the process of the present invention, at least 70% of the vinylbenzyloxyalkyl derivative used can be arranged and orientated on the surface of primary particles and/or in the neighborhood thereof (especially when n is at least 4 in the formula (1)). In other words, while the amount of vinylbenzyloxyalkyl derivative to be arranged and orientated on the surface of primary particles is restricted for a limited space, 30% by weight of vinylbenzyloxyalkyl derivative based on the total amount of the monomers is sufficient to obtain the contemplated functional group-containing porous resin.

There is no specific limitation on the polymerization initiators to be used insofar as they are soluble in the monomers. For example, benzoyl peroxide, lauryl peroxide and like organic peroxides, azobisisobutyronitrile and like azo compounds can be used. The amount of the polymerization initiator to be used is selected from an optional range depending on the required properties of the porous resin to be produced and so on. Usually the amount is about 0.5 to about 5% by weight based on the total amount of the monomers used.

The organic solvent to be mixed with the monomers is one which does not participate in polymerization and which is sparingly soluble in water, the monomer mixture being soluble in the organic solvent but the resulting copolymer being insoluble therein. Such solvent can satisfactorily achieve the function of the so-called porogen.

In order to more effectively arrange and orientate the functional group on the surface of primary particles of the obtained porous resin and/or in the neighborhood thereof, it is preferred to use an organic solvent which has a high affinity for the vinylbenzyloxyalkyl derivative serving as a functional group-containing monomer.

When the vinylbenzyloxyalkyl derivative of the formula (1) wherein A is a hydroxyl group is used, hydrocarbon solvents having 6 to 12 carbon atoms or aliphatic alcohol solvents having 4 to 10 carbon atoms are especially preferred. Specific examples of useful hydrocarbon solvents are hexane, heptane, octane, nonane, decane and dodecane. Specific examples of useful aliphatic alcohol solvents are butanol, pentanol, hexanol, heptanol, octanol and decanol. Of course, the hydrocarbon moiety may be of straight- or branched-chain type. These organic solvents can be used either alone or in combination.

When the vinylbenzyloxyalkyl derivative of the formula (1) wherein A is a halogen atom is used, hydrocarbon solvents having 6 to 12 carbon atoms or alkyl halide solvents having 3 to 12 carbon atoms are preferred. Specific examples of useful hydrocarbon solvents are hexane, heptane, octane, nonane, decane, undecane and dodecane. Specific examples of useful alkyl halide solvents are alkyl bromides such as propyl bromide, butyl bromide, pentyl bromide, hexyl bromide, heptyl bromide, octyl bromide, nonyl bromide, decyl bromide, undecyl bromide and dodecyl bromide; alkyl chlorides such as propyl chloride, butyl chloride, pentyl chloride, hexyl chloride, heptyl chloride, octyl chloride, nonyl chloride, decyl chloride, undecyl chloride and dodecyl chloride; and alkyl iodides such as propyl iodide, butyl iodide, pentyl iodide, hexyl iodide, heptyl iodide, octyl iodide, nonyl iodide, decyl iodide, undecyl iodide and dodecyl iodide. Of course, the hydrocarbon moiety may be of straight- or branched-chain type. These organic solvents can be used either alone or in combination.

The mixing ratio of the organic solvent to the monomer mixture is selected from an optional range according to the required properties of the porous resin to be produced. Usually the organic solvent/monomer mixture volume ratio ranges approximately from 70/30 to 25/75. Outside said range, a resin having the desired porotic structure can not be obtained in most cases.

Next, discussed below are the suspension polymerization procedure and the purification procedure which can be employed in the present invention.

The suspension polymerization procedure of the invention can be the same as conventional methods, and the polymerization can be conducted by known methods. For example, a commonly employed suspension polymerization method usable in the invention comprises uniformly mixing the foregoing monomers, polymerization initiator and organic solvent to give a monomer solution, stirring the solution in an aqueous medium optionally containing a suitable dispersant to disperse or suspend the components, and heating the dispersion or suspension for polymerization. The so-called micro-suspension polymerization method which can be optionally carried out comprises stirring said monomer solution in said suspension polymerization using a homomixer or a homogenizer operable at a high velocity in an aqueous medium containing a suitable dispersant to finely disperse the components and heating the dispersion with stirring of ordinary order to accomplish polymerization. The micro-suspension polymerization provides secondary particles having a shorter diameter than the secondary particles obtainable by usual suspension polymerization methods.

Dispersants useful in the suspension polymerization include, for example, polyvinyl alcohol and gelatin which are generally well known. The amount of the dispersant to be used is not specifically limited insofar as the amount is sufficient to stably disperse the monomer solution into droplets having the required diameter of the obtained secondary particles in the polymerization. The volume ratio of the monomer solution to the aqueous dispersion is not specifically limited insofar as it is within the range in which the suspension polymerization stably proceeds. While there is no specific restriction on the polymerization temperature and the polymerization time, it is preferred to effect the polymerization under optimum conditions in consideration of the decomposition temperature of the polymerization initiator, the half-life thereof, the boiling point of the organic solvent, etc.

For the purification of the resin, conventional purifying methods can be used without change. For example, the obtained resin is filtered, washed with hot water to remove the dispersant from the resin particles, further fully washed with acetone and/or methanol and heated under reduced pressure for drying to eliminate the remaining unreacted monomer and the organic solvent, whereby the contemplated functional group-containing porous resin is obtained.

Among the functional group-containing porous resins thus obtained, the porous resin having a hydroxyl group as a functional group is characterized by the evaluated results of chemical properties such as a hydroxyl value, a hydroxyl orientation ratio (%), etc. as well as general properties such as a specific surface area, particle sizes of primary and secondary particles, etc. The amount of a reactive hydroxyl group in the resin can be determined from the hydroxyl value. The hydroxyl orientation ratio (%) is equal to the ratio of the "amount of hydroxyl group present on the surface of primary particles and/or in the neighborhood thereof" to the "amount of hydroxyl group based on the vinylbenzyloxyalkanol used for the polymerization". Consequently a substantial efficiency of hydroxyl group content can be determined from said value. The "amount of hydroxyl group present on the surface of primary particles and/or in the neighborhood thereof" can be calculated from the hydroxyl value of the resin.

The process of the present invention gives a hydroxyl-containing resin which has a high specific surface area of at least 50 m²/g, a hydroxyl orientation ratio of at least 75% and a high hydroxyl value of about 5 to about 60 mg KOH/g. In the hydroxyl-containing resin of the present invention, the secondary particles (apparent particles) generally have a spherical and opaque appearance. In this case, the particle size of the primary particles is in the range of about 10 to about 100 nm and the particle size of the secondary particles is in the range of about 1 to about 1,000 μm.

Among the functional group-containing porous resins obtained above, the porous resin having a halogen group as a functional group is characterized by the evaluated results of chemical properties such as an effective amount of halogen group (mmol/g), halogen group orientation ratio (%), etc. as well as general properties such as a specific surface area, particle sizes of primary and secondary particles, etc. The term "effective amount of halogen group" (mmol/g) used herein refers to a substantial content of the —(CH$_2$)$_n$—X moiety derived from the halogen-containing structural unit represented by the formula (2). Stated more specifically, the value can be calculated from a reaction conversion based on the so-called Menschutkin reaction (quaternization reaction) wherein triethylamine is caused to act on the resin, thereby converting said moiety to —CH$_2$N$^+$(C$_2$H$_5$)$_3$X$^-$. This evaluation method is devised directing attention to the following fact: since each primary particle is highly crosslinked in the invention, the —(CH$_2$)$_n$—X moiety as embedded deep into the primary particle is not reactive and only said moiety existing on the surface of primary particle and/or in the neighborhood thereof is reactive. Namely the term "effective amount of halogen group" used herein refers to nothing but the amount of halogen group existing on the surface of primary particles and/or in the neighborhood thereof. The halogen group orientation ratio (%) means a ratio of "the amount of halogen group present on the surface of primary particles and/or in the neighborhood thereof" to "the total amount of halogen group in the resin as calculated based on the elemental analysis of the resin" (which is identical with the theoretical amount of halogen group calculated from the make-up of the monomers used). The amount of halogen group present on the surface of primary particles and/or in the neighborhood thereof can be calculated from the effective amount of halogen group obtained hereinbefore.

The process of the present invention gives a halogen group-containing porous resin which has a high specific surface area of at least 50 m²/g, a halogen group orientation ratio of at least 70% and a high effective amount of halogen group (—(CH$_2$)$_n$—X moiety) of about 0.1 to about 1.0 mmol/g. In the halogen group-containing porous resin of the present invention, the secondary particles (apparent particles) have a spherical and opaque appearance. In this case, the particle size of the secondary particles is in the range of about 1 to about 1,000 μm, and the particle size of the primary particles is in the range of about 10 to about 100 nm.

Such functional group-containing resins of the present invention, of course, show excellent properties by themselves when used as column packings, adsorbers, supports or the like. Further these resins can undergo various chemical secondary modifications utilizing the functional group of the resin and are very useful as functional porous resins. In addition, the functional group exists away from the main chain of the polymer with a spacer interposed therebetween. Consequently the functional group is presumed to fully exhibit its inherent reactivity, thereby enabling facilitated secondary modifications of the resin.

The functional group-containing porous resin of the present invention is excellent in mechanical strength and chemical stability because the base resin thereof is the divinylbenzene-styrene resin and is very useful by themselves as column packings, adsorbers or supports as described above. Moreover, the resin can be converted to a more useful functional porous resin by chemical secondary modifications. According to the process of the present invention, the functional group can be efficiently arranged and orientated on the surface of primary particles and/or in the neighborhood thereof, and the functional group scarcely becomes embedded in the interior of primary particles so that the amount of the vinylbenzyloxyalkyl derivative to be used can be reduced to the required minimum range.

BEST MODE OF CARRYING OUT THE INVENTION

Examples and Comparative Examples are given below to clarify the present invention in more detail.

Examples For Hydroxyl-Containing Porous Resin

Example 1

Ion exchange water (150 ml) was charged into a 300 ml separable flask equipped with a stirrer, thermometer, nitrogen line and condenser, and 3.0 g of polyvinyl alcohol was added to obtain a solution. Added thereto was a monomer mixture solution comprising 16.42 g of divinylbenzene (content (purity) 55% and the balance 45% being ethylvinylbenzene), 9.58 g of styrene, 1.37 g of vinylbenzyloxyhexanol (n is 6 and A is a hydroxyl group in the formula (1)), 13.68 g of n-heptane and 0.55 g of azobisisobutyronitrile. The resulting mixture was stirred in a nitrogen stream at an agitation velocity of about 400 to about 500 rpm for 10 minutes. The obtained mixture was heated to 75° to 80° C. and polymerized over a period of 6 hours while maintaining the temperature. After polymerization, the obtained product was cooled to room temperature. The obtained resin was separated by filtration, washed well with hot water and acetone, respectively and finally heated (to 70° to 80° C.) under reduced pressure (about 1 mm/Hg) for drying, producing 25.8 g (yield 94%) of a hydroxyl-containing porous resin. The resin had an apparent particle size (particle size of secondary particles) of 220±70 μm, a particle size of primary particles of 45±10 nm, a specific surface area of 215 m²/g, and a hydroxyl value of 10.1 mg KOH/g. Examples 2 to 8 and Comparative Examples 1 and 2

Suspension polymerization was conducted in the same manner as in Example 1 with the exception of altering the amount of the monomers used, and the amount and type of organic solvents used as shown in Table 1, giving a resin.

Example 9

Ion exchange water (160 ml) was charged into a 300 ml separable flask and 0.4 g of polyvinyl alcohol was added to obtain a solution. Added thereto was a monomer mixture solution comprising 13.14 g of divinylbenzene (content (purity) 55% and the balance 45% being ethylvinylbenzene), 7.66 g of styrene, 1.09 g of vinylbenzyloxyhexanol, 10.94 g of n-heptane and 0.44 g of azobisisobutyronitrile. The obtained mixture was dispersed at an agitation velocity of about 10,000 rpm for 2 minutes using a homogenizer (product of IKA Co., Ltd.). Then, replacing the homogenizer with a usual type stirrer and setting a thermometer, nitrogen line and condenser, the dispersion was stirred in a nitrogen stream at an agitation velocity of about 400 to about 500 rpm, heated to 75° to 80° C. and polymerized over a period of 6 hours while maintaining the temperature. After polymerization, the obtained product was cooled to room temperature, giving a resin. The obtained resin was separated by filtration, washed well with hot water, methanol and acetone, respectively, and finally heated (to 70° to 80° C.) under reduced pressure (about 1 mm/Hg) for drying, producing 20.2 g (yield 92%) of a hydroxyl-containing porous resin. The resin had an apparent particle size (particle size of secondary particles) of 7±3 μm, a particle size of primary particles of 40±10 nm, a specific surface area of 180 m²/g, and a hydroxyl value of 9.9 mg KOH/g.

Example 10 and Comparative Example 3

Micro-suspension polymerization was conducted in the same manner as in Example 9 with the exception of altering the amount and the type of the monomers and organic solvents used as shown in Table 1, giving a resin.

TABLE 1

| | Amount of monomers used (The parenthesized values being by weight percentage based on the total amount of monomers) | | | |
|---|---|---|---|---|
| | Divinyl-benzene | Ethylvinyl-benzene | Styrene | Vinylbenzyloxyalkyl derivative |
| Ex. 1 | 9.03 g (33%) | 7.39 g (27%) | 9.58 g (35%) | Vinylbenzyloxyhexanol 1.37 g (5%) |
| Ex. 2 | 9.06 g (33%) | 7.41 g (27%) | 8.24 g (30%) | Vinylbenzyloxyhexanol 2.75 g (10%) |
| Ex. 3 | 9.09 g (33%) | 7.43 g (27%) | 6.88 g (25%) | Vinylbenzyloxyhexanol 4.13 g (15%) |
| Ex. 4 | 9.11 g (33%) | 7.46 g (27%) | 5.52 g (20%) | Vinylbenzyloxyhexanol 5.52 g (20%) |
| Ex. 5 | 9.06 g (33%) | 7.41 g (27%) | 8.24 g (30%) | Vinylbenzyloxyhexanol 2.75 g (10%) |
| Ex. 6 | 9.06 g (33%) | 7.41 g (27%) | 8.24 g (30%) | Vinylbenzyloxyhexanol 2.75 g (10%) |
| Ex. 7 | 9.07 g (33%) | 7.42 g (27%) | 8.24 g (30%) | Vinylbenzyloxydecanol 2.75 g (10%) |
| Ex. 8 | 9.01 g (33%) | 7.37 g (27%) | 8.19 g (30%) | Vinylbenzyloxyethanol 2.73 g (10%) |
| Ex. 9 | 7.23 g (33%) | 5.91 g (27%) | 7.66 g (35%) | Vinylbenzyloxyhexanol 1.09 g (5%) |
| Ex. 10 | 7.25 g (33%) | 5.93 g (27%) | 6.59 g (30%) | Vinylbenzyloxyhexanol 2.20 g (10%) |
| Comp. Ex. | | | | |
| 1 | 9.00 g (33%) | 7.37 g (27%) | 10.92 g (40%) | None |
| 2 | 15.10 g (33%) | 12.35 g (27%) | 13.73 g (30%) | Vinylbenzyloxyhexanol 4.58 g (10%) |
| 3 | 7.20 g (33%) | 5.89 g (27%) | 8.73 g (40%) | None |

| | Amount of organic solvent used | | | Monomer/ organic solvent (volume ratio) | Method of polymerization |
|---|---|---|---|---|---|
| | n-Heptane | n-Octane | n-Hexanol | | |
| Ex. 1 | 13.68 g | None | None | 60/40 | Suspension |
| Ex. 2 | 13.68 g | None | None | 60/40 | Suspension |
| Ex. 3 | 13.68 g | None | None | 60/40 | Suspension |
| Ex. 4 | 13.68 g | None | None | 60/40 | Suspension |
| Ex. 5 | None | 14.06 g | None | 60/40 | Suspension |
| Ex. 6 | 7.50 g | None | 7.50 g | 60/40 | Suspension |
| Ex. 7 | 13.68 g | None | None | 60/40 | Suspension |
| Ex. 8 | 13.68 g | None | None | 60/40 | Suspension |
| Ex. 9 | 10.94 g | None | None | 60/40 | Micro-suspension |
| Ex. 10 | 10.94 g | None | None | 60/40 | Micro-suspension |
| Comp. Ex. | | | | | |
| 1 | 13.68 g | None | None | 60/40 | Suspension |
| 2 | None | None | None | 100/0 | Suspension |
| 3 | 10.94 g | None | None | 60/40 | Micro-suspension |

Some properties of the porous resins prepared in Examples 1 to 10 and Comparative Examples 1 to 3 were evaluated by the following methods.

Particle size of secondary particles (μm): The diameter of the secondary particles was measured based on an optical microphotograph (optical microscope manufactured by Olympus Co., Ltd., "BHSM").

Particle size of primary particles (nm): The diameter of the secondary particles was measured from an optical microphotograph (scanning electron microscope manufactured by Hitachi, Ltd., "S-2000").

Specific surface area ($m^2/g$): The specific surface area was measured by a BET surface area measuring device (product of Quantachrome Co., Ltd., "Quantasorb Surface Analyzer"). Hydroxyl value (mg KOH/g): A modification of neutralization titration method (JIS K 0070) was conducted as follows.

One gram of the resin was placed into a flat bottom flask. Added were 2.5 ml of an acetylation reagent (prepared by placing 25 g of acetic anhydride into a 100 ml measuring flask, adding pyridine to make a 100 ml mixture and shaking the mixture well) and 2.5 ml of pyridine. The mixture was heated on an oil bath at 60° C. for 2 hours. The mixture was cooled to room temperature, 1 ml of water was added and the mixture was heated on an ultrasonic bath at 80° C. for 1 hour to decompose the acetic anhydride. After leaving the mixture to cool, the internal wall of the flask was washed with 5 ml of ethanol. Several droplets of a phenolphthalein solution were added as an indicator, and the mixture was titrated with 0.5 mol/l of a solution of potassium hydroxide in ethanol to evaluate the hydroxyl value (mg KOH/g).

With a divinylbenzene-styrene resin like the porous resin of the present invention, acetylation proceeds under the above-specified conditions on the surface of primary particles and/or in the neighborhood thereof and no substance permeates into the primary particles for reaction since the primary particles are highly crosslinked. Consequently the hydroxyl value measured above is based on the hydroxyl group existing on the surface of the resin (primary particles) and/or in the neighborhood thereof.

Hydroxyl orientation ratio (%): The ratio was calculated by the following equation. Hydroxyl orientation ratio (%)= (amount (mmol/g) of hydroxyl group on the resin surface and/or in the neighborhood thereof×100)/(theoretical amount (mmol/g) of hydroxyl group based on the amount of vinylbenzyloxyalkanol)

The amount of hydroxyl group on the resin surface (primary particles) and/or in the neighborhood thereof was calculated by the following equation. Amount (mmol/g) of hydroxyl group on the resin surface and/or in the neighborhood thereof= hydroxyl value (mg KOH/g)/56.11 (g/mol)

The theoretical amount of hydroxyl group based on the amount of the vinylbenzyloxyalkanol used was calculated by the following equation.

Theoretical amount (mmol/g) of hydroxyl group=(weight percentage of vinylbenzyloxyalkanol moiety in the resin× 1000)/(molecular weight of vinylbenzyloxyalkanol (g/mol))

Table 2 below shows the measured values of properties of porous resins prepared in Examples 1 to 10 and Comparative Examples 1 to 3.

TABLE 2

| | Appearance of apparent particle | Particle size of secondary particle (μm) | Particle size of primary particle (nm) | Specific surface area ($m^2/g$) |
|---|---|---|---|---|
| Ex. 1 | Spherical/opaque | 220 ± 70 | 45 ± 10 | 215 |
| Ex. 2 | Spherical/opaque | 180 ± 50 | 50 ± 10 | 205 |

TABLE 2-continued

| | | | | |
|---|---|---|---|---|
| Ex. 3 | Spherical/opaque | 200 ± 80 | 55 ± 10 | 203 |
| Ex. 4 | Spherical/opaque | 200 ± 90 | 55 ± 10 | 193 |
| Ex. 5 | Spherical/opaque | 190 ± 70 | 50 ± 10 | 214 |
| Ex. 6 | Spherical/opaque | 170 ± 60 | 50 ± 10 | 178 |
| Ex. 7 | Spherical/opaque | 200 ± 80 | 55 ± 10 | 193 |
| Ex. 8 | Spherical/opaque | 190 ± 70 | 45 ± 10 | 225 |
| Ex. 9 | Spherical/opaque | 7 ± 3 | 40 ± 10 | 180 |
| Ex. 10 | Spherical/opaque | 7 ± 3 | 45 ± 10 | 96 |
| Comp. Ex. | | | | |
| 1 | Spherical/opaque | 180 ± 70 | 40 ± 10 | 255 |
| 2 | Spherical/clear | 210 ± 90 | Not observed* | <0.2 |
| 3 | Spherical/opaque | 7 ± 2 | 40 ± 10 | 221 |

| | Hydroxyl value (mg KOH/g) | Amount of hydroxyl group on resin surface and/or in neighborhood thereof (mmol/g) | Theoretical amount of hydroxyl group (mmol/g) | Hydroxyl orientation ratio (%) |
|---|---|---|---|---|
| Ex. 1 | 10.1 | 0.18 | 0.21 | 85.3 |
| Ex. 2 | 19.4 | 0.35 | 0.42 | 82.0 |
| Ex. 3 | 28.5 | 0.51 | 0.63 | 80.3 |
| Ex. 4 | 37.9 | 0.68 | 0.84 | 80.1 |
| Ex. 5 | 19.8 | 0.35 | 0.42 | 83.7 |
| Ex. 6 | 21.4 | 0.38 | 0.42 | 90.3 |
| Ex. 7 | 16.7 | 0.30 | 0.34 | 87.4 |
| Ex. 8 | 10.1 | 0.18 | 0.55 | 32.5 |
| Ex. 9 | 9.9 | 0.18 | 0.21 | 83.9 |
| Ex. 10 | 17.7 | 0.32 | 0.42 | 75.0 |
| Comp. Ex. | | | | |
| 1 | 0 | 0 | 0 | — |
| 2 | <2.3 | <0.04 | 0.42 | <10 |
| 3 | 0 | 0 | 0 | — |

*Note:
*The primary particles were not observed.

Examples for Halogen Group-Containing Porous Resin

Example 11

Ion exchange water (150 ml) was charged into a 300 ml separable flask equipped with a stirrer, thermometer, nitrogen line and condenser, and 3.0 g of polyvinyl alcohol was added to give a solution. Added thereto was a monomer mixture solution comprising 16.6 g of divinylbenzene (content (purity) 55% and the balance 45% being ethylvinylbenzene), 6.92 g of styrene, 4.15 g of vinylbenzyloxyhexyl bromide (n is 6 and A is a bromide atom in the formula (1)), 13.68 g of n-heptane and 0.55 g of azobisisobutyronitrile. The mixture was stirred in a nitrogen stream at an agitation velocity of about 400 to about 500 rpm for 10 minutes. The resulting mixture was heated to 75° to 80° C. and polymerized over a period of 6 hours while maintaining the temperature. After polymerization, the obtained product was cooled to room temperature, giving a resin. The obtained resin was separated by filtration, washed well with hot water and with acetone, and finally heated (to 70° to 80° C.) under reduced pressure (about 1 mm/Hg) for drying, producing 26.2 g (yield 96%) of a halogen group-containing porous resin. The resin had an apparent particle size (particle size of secondary particles) of 170±50 µm, a particle size of primary particles of 50±10 nm, and a specific surface area of 213 m²/g. The total amount of halogen group in the resin as calculated from the elemental analysis of the resin was 0.50 mmol/g, which was identical with the theoretical amount (0.50 mmol/g) of halogen group as calculated based on the make-up of the monomers used. The amount of halogen group (effective amount of halogen group) on the resin surface (primary particles) and/or in the neighborhood thereof as calculated by a quaternization reaction with triethylamine was 0.42 mmol/g.

Examples 12 to 19 and Comparative Examples 4 and 5

Suspension polymerization was conducted in the same manner as in Example 11 with the exception of altering the type and amount of the monomers and organic solvents used as shown in Table 3, thereby giving a resin.

Example 20

Ion exchange water (160 ml) was charged into a 300 ml separable flask and 0.4 g of polyvinyl alcohol was added to give a solution. Thereto added was a monomer mixture solution comprising 13.22 g of divinylbenzene (content (purity) 55% and the balance 45% being ethylvinylbenzene), 6.61 g of styrene, 2.20 g of vinylbenzyloxyhexyl bromide, 10.94 g of n-heptane and 0.44 g of azobisisobutyronitrile. The mixture was dispersed using a homogenizer (product of IKA Co., Ltd.) at an agitation velocity of about 10,000 rpm for 2 minutes. Then, the homogenizer was replaced by a conventional stirrer and a thermometer, nitrogen line and condenser were set. The obtained dispersion was heated to 75° to 80° C. with stirring at about 400 to about 500 rpm in a nitrogen stream and polymerized over a period of 6 hours while maintaining the temperature. After polymerization, the obtained product was cooled to room temperature, giving a resin. The obtained resin was separated by filtration, washed well with hot water, methanol and acetone, respectively, and finally heated (to 70° to 80° C.) under reduced pressure (about 1 mm/Hg) for drying, producing 20.5 g (yield 93%) of a halogen group-containing porous resin. The resin had an apparent particle size (particle size of secondary particles) of 7±2 µm, a particle size of primary particles of 45±10 nm, and a specific surface area of 211 m²/g. The total amount of halogen group in the resin as calculated from the elemental analysis of the resin was 0.33 mmol/g, which was identical with the theoretical amount (0.33 mmol/g) of halogen group as calculated based on the make-up of the monomers used. The amount of halogen group (effective amount of halogen group) on the resin surface (primary particles) and/or in the neighborhood thereof as calculated by a quaternization reaction with triethylamine was 0.28 mmol/g.

Examples 21 to 22 and Comparative Example 6

Micro-suspension polymerization was conducted in the same manner as in Example 20 with the exception of altering the type and amount of the monomers and organic solvents used as shown in Table 3, giving a resin.

TABLE 3

Amount of monomers used (The parenthesized values being by weight percentage based on the total amount of monomers)

| | Divinyl-benzene | Ethylvinyl-benzene | Styrene | Vinylbenzyloxyalkyl derivative |
|---|---|---|---|---|
| Ex. 11 | 9.13 g (33%) | 7.47 g (27%) | 6.92 g (25%) | Vinylbenzyloxyhexyl bromide 4.15 g (15%) |
| Ex. 12 | 9.05 g (33%) | 7.40 g (27%) | 9.59 g (35%) | Vinylbenzyloxyhexyl bromide 1.37 g (5%) |
| Ex. 13 | 9.09 g (33%) | 7.44 g (27%) | 8.26 g (30%) | Vinylbenzyloxyhexyl bromide 2.75 g (10%) |
| Ex. 14 | 9.21 g (33%) | 7.54 g (27%) | 4.19 g (15%) | Vinylbenzyloxyhexyl bromide 6.98 g (25%) |
| Ex. 15 | 9.13 g (33%) | 7.47 g (27%) | 6.92 g (25%) | Vinylbenzyloxyhexyl bromide 4.15 g (15%) |
| Ex. 16 | 9.08 g (33%) | 7.43 g (27%) | 8.26 g (30%) | Vinylbenzyloxydecyl bromide 2.75 g (10%) |
| Ex. 17 | 9.22 g | 7.54 g | 6.98 g | Vinylbenzyloxybutyl bromide |

TABLE 3-continued

| | | | | |
|---|---|---|---|---|
| Ex. 18 | 9.29 g (33%) | 7.60 g (27%) | 7.04 g (25%) | Vinylbenzyloxyethyl bromide 4.19 g (15%) |
| Ex. 19 | 9.13 g (33%) | 7.47 g (27%) | 6.92 g (25%) | Vinylbenzyloxyhexyl chloride 4.22 g (15%) |
| Ex. 20 | 7.27 g (33%) | 5.95 g (27%) | 6.61 g (30%) | Vinylbenzyloxyhexyl bromide 4.15 g (15%) |
| Ex. 21 | 7.30 g (33%) | 5.98 g (27%) | 5.53 g (25%) | Vinylbenzyloxyhexyl bromide 2.20 g (10%) |
| Ex. 22 | 7.27 g (33%) | 5.95 g (27%) | 6.61 g (30%) | Vinylbenzyloxydecyl bromide 3.32 g (15%) |
| Comp. Ex. | | | | |
| 4 | 9.01 g (33%) | 7.37 g (27%) | 10.92 g (40%) | None |
| 5 | 15.22g (33%) | 12.45 g (27%) | 11.53 g (25%) | Vinylbenzyloxyhexyl bromide 6.92 g (15%) |
| 6 | 7.20 g (33%) | 5.89 g (27%) | 8.73 g (40%) | None |

| | Amount of organic solvent used | | Monomer/ | |
|---|---|---|---|---|
| | n-Heptane | n-Hexyl bromide | organic solvent (volume ratio) | Method of polymerization |
| Ex. 11 | 13.68 g | None | 60/40 | Suspension |
| Ex. 12 | 13.68 g | None | 60/40 | Suspension |
| Ex. 13 | 13.68 g | None | 60/40 | Suspension |
| Ex. 14 | 13.68 g | None | 60/40 | Suspension |
| Ex. 15 | 11.76 g | 5.04 g | 60/40 | Suspension |
| Ex. 16 | 13.68 g | None | 60/40 | Suspension |
| Ex. 17 | 13.68 g | None | 60/40 | Suspension |
| Ex. 18 | 13.68 g | None | 60/40 | Suspension |
| Ex. 19 | 13.68 g | None | 60/40 | Suspension |
| Ex. 20 | 10.94 g | None | 60/40 | Micro-suspension |
| Ex. 21 | 10.94 g | None | 60/40 | Micro-suspension |
| Ex. 22 | 10.94 g | None | 60/40 | Micro-suspension |
| Comp. Ex. | | | | |
| 4 | 13.68 g | None | 60/40 | Suspension |
| 5 | None | None | 100/0 | Suspension |
| 6 | 10.94 g | None | 60/40 | Micro-suspension |

Some properties of the porous resins prepared in Examples 11 to 22 and Comparative Examples 4 to 6 were evaluated by the following methods. Other properties than those undermentioned were determined by the methods described hereinbefore.

Elemental analysis (C, H): The elemental analysis was performed by an elemental analyzer (product of Perkin Elmer Co., Ltd., "2400 CHN").

Elemental analysis (N): The elemental analysis was performed by a nitrogen minute content analyzer (product of Mitsubishi Kasei K. K., "TN-10").

Elemental analysis (Br): The elemental analysis was performed by a combustion gas absorption-ion chromatography method.

Total amount (mmol/g) of halogen group in the resin: The total amount of halogen group in the resin was calculated based on the make-up of monomers used (efficacy of polymerization initiator (AIBN) being assumed to be 0.4–0.6). It was confirmed that the theoretical calculation values of C, H, N and Br (%) in this case were identical with the found values of C, H, N and Br (%) by the elemental analysis of the resin.

The specific results of elemental analysis using the resin of Example 11 as an example are shown in Table 4. The molar ratios of divinylbenzene, ethylvinylbenzene, styrene, vinylbenzyloxyhexyl bromide and AIBN in the make-up giving the structural units of the polymer which were used in the theoretical calculation were 0.334, 0.274, 0.319, 0.067 and 0.007, respectively.

TABLE 4

| | Found value (A) | Calculated value (B) | Δ (A − B) |
|---|---|---|---|
| C % | 86.02 | 86.17 | −0.15 |
| H % | 7.90 | 7.96 | −0.06 |
| N % | 0.14 | 0.14 | 0.00 |
| Br % | 3.96 | 3.97 | −0.01 |

In the instances of Examples 12 to 20 and Comparative Examples 4 to 6, the theoretical calculation values closely agreed with the found values.

Effective amount (mmol/g) of halogen group in the resin: It was calculated from a reaction conversion based on the Menschutkin reaction of the resin with triethylamine. The reaction was performed as follows. A resin (2 g) was placed into a 50 ml round-bottom flask equipped with a condenser and a stirrer. After 20 ml of ethanol and 5.1 g of triethylamine were added, the mixture was heated with stirring on an oil bath at 70° C. for 24 hours. The resin was separated by filtration and suspended in 20 ml of ethanol. The resin was washed well in an ultrasonic bath at 50° C. for 10 minutes and then washed well with 20 ml of acetone. After repetition of said washing procedure a few times, the resin was separated by filtration and fully dried at 50° C. under reduced pressure (1 mm Hg). The ratio of the amount of reacted halogen atoms to the amount of halogen atoms throughout the resin was calculated from the values obtained by the elemental analysis of the resin before and after the reaction (e.g. N % increases with the rise of reaction conversion). Thereby the amount of the $-(CH_2)_n-X$ moiety (effective amount of halogen group) which actually reacted with triethylamine can be theoretically calculated. The specific results of elemental analysis using a reaction product (reaction conversion 83%) of the resin of Example 11 with triethylamine taken as an example are shown in Table 5. The molar ratios of divinylbenzene, ethylvinylbenzene, styrene, vinylbenzyloxyhexyl bromide, triethylvinylbenzyloxyhexyl-ammonium bromide (vinylbenzyloxyhexyl bromide having $-(CH_2)_n-X$ moiety reacted with triethylamine) and AIBN in the make-up giving the structural units of the polymer were 0.334, 0.274, 0.319, 0.011, 0.056 and 0.007, respectively.

TABLE 5

| | Found value (before reaction) | Found value (after reaction) (A) | Theoretical calculation value based on reaction product (reaction conversion 83%) (B) | Δ (A − B) |
|---|---|---|---|---|
| C % | 86.17 | 85.41 | 85.24 | 0.17 |
| H % | 7.96 | 8.16 | 8.21 | −0.05 |
| N % | 0.14 | 0.69 | 0.69 | 0.00 |
| Br % | 3.97 | 3.77 | 3.79 | −0.02 |

In a divinylbenzene-styrene resin like the porous resin of the present invention, a reaction occurs under the above-specified conditions on the surface of primary particles and/or in the neighborhood thereof but not in the interior of primary particles, since the primary particles are highly crosslinked. Consequently the reaction conversion (%) based on the reaction is nothing but the orientation ratio (%) of halogen group on the surface of primary particles and/or in the neighborhood thereof.

Some properties of the resins prepared in Examples 11 to 22 and Comparative Examples 4 to 6 are shown in Table 6.

TABLE 6

| | Appearance of apparent particle | Particle size of secondary particle (μm) | Particle size of primary particle (nm) | Specific surface area (m²/g) |
|---|---|---|---|---|
| Ex. 11 | Spherical/opaque | 170 ± 50 | 50 ± 10 | 213 |
| Ex. 12 | Spherical/opaque | 150 ± 50 | 45 ± 10 | 231 |
| Ex. 13 | Spherical/opaque | 160 ± 50 | 45 ± 10 | 225 |
| Ex. 14 | Spherical/opaque | 170 ± 50 | 55 ± 10 | 189 |
| Ex. 15 | Spherical/opaque | 170 ± 50 | 50 ± 10 | 217 |
| Ex. 16 | Spherical/opaque | 200 ± 60 | 60 ± 10 | 168 |
| Ex. 17 | Spherical/opaque | 160 ± 50 | 50 ± 10 | 223 |
| Ex. 18 | Spherical/opaque | 160 ± 50 | 45 ± 10 | 235 |
| Ex. 19 | Spherical/opaque | 170 ± 50 | 50 ± 10 | 215 |
| Ex. 20 | Spherical/opaque | 7 ± 2 | 45 ± 10 | 211 |
| Ex. 21 | Spherical/opaque | 7 ± 2 | 45 ± 10 | 207 |
| Ex. 22 | Spherical/opaque | 7 ± 3 | 45 ± 10 | 201 |
| Comp. Ex. | | | | |
| 4 | Spherical/opaque | 180 ± 60 | 40 ± 10 | 255 |
| 5 | Spherical/clear | 200 ± 70 | Not observed* | <0.1 |
| 6 | Spherical/opaque | 7 ± 2 | 40 ± 10 | 221 |

| | Total amount of halogen group in the resin as calcd. based on elemental analysis (mmol/g) | Amount of halogen group on resin surface and/or in its neighborhood (mmol/g) | Halogen group orientation ratio (%) |
|---|---|---|---|
| Ex. 11 | 0.50 | 0.42 | 83 |
| Ex. 12 | 0.17 | 0.14 | 82 |
| Ex. 13 | 0.33 | 0.27 | 82 |
| Ex. 14 | 0.84 | 0.67 | 80 |
| Ex. 15 | 0.50 | 0.43 | 86 |
| Ex. 16 | 0.28 | 0.24 | 86 |
| Ex. 17 | 0.55 | 0.39 | 71 |
| Ex. 18 | 0.62 | 0.20 | 32 |
| Ex. 19 | 0.59 | 0.50 | 85 |
| Ex. 20 | 0.33 | 0.28 | 85 |
| Ex. 21 | 0.50 | 0.41 | 82 |
| Ex. 22 | 0.28 | 0.24 | 86 |
| Comp. Ex. | | | |
| 4 | 0 | 0 | — |
| 5 | 0.50 | <0.05 | <10 |
| 6 | 0 | 0 | — |

Note:
*The primary particles were not observed.

What is claimed is:

1. A functional group-containing porous resin prepared by polymerization of a monomer mixture of; based on 100% by weight of the total amount of the monomers, 15 to 97% by weight of divinylbenzene, 0 to 82% by weight of at least one aromatic monovinyl monomer selected from the group consisting of styrene, methylstyrene and ethylvinylbenzene and 3 to 30% by weight of a vinylbenzyloxyalkyl derivative represented by the formula

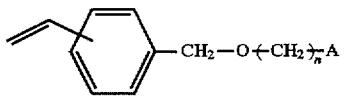

(1)

wherein n is an integer of 2 to 16 and A represents a hydroxyl group or a halogen atom.

2. The porous resin according to claim 1, wherein the vinylbenzyloxyalkyl derivative is a derivative of the formula (1) in which A represents a hydroxyl group.

3. The porous resin according to claim 2 which has a specific surface area of at least 50 m²/g and a hydroxyl value of 5 to 60 mg KOH/g.

4. The porous resin according to claim 1, wherein the vinylbenzyloxyalkyl derivative is a derivative of the formula (1) in which A represents a halogen atom.

5. The porous resin according to claim 4 which has a specific surface area of at least 50 m²/g and which contains 0.1 to 1.0 mmol/g of a halogen group derived from the structural units represented by the formula

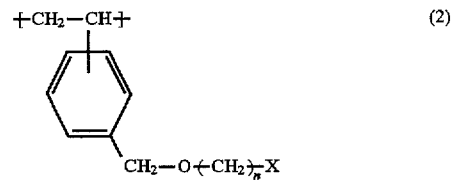

(2)

wherein n is an integer of 2 to 16 and X represents a halogen atom.

6. A process for preparing the functional group-containing porous resin of claim 1, the process comprising the steps of mixing a monomer mixture of divinylbenzene, at least one aromatic monovinyl monomer selected from the group consisting of styrene, methylstyrene and ethylvinylbenzene and a vinylbenzyloxyalkyl derivative represented by the formula

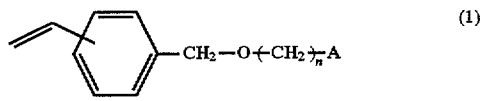

(1)

wherein n is an integer of 2 to 16 and A represents a hydroxyl group or a halogen atom with an organic solvent which does not participate in polymerization and which is sparingly soluble in water, said monomer mixture being soluble in said organic solvent but the resulting copolymer being insoluble in said solvent; and subjecting the obtained solution in an aqueous medium to suspension polymerization using a radical polymerization initiator.

7. The process for preparing the porous resin according to claim 6, wherein the vinylbenzyloxyalkyl derivative is a derivative of the formula (1) in which A represents a hydroxyl group.

8. The process according to claim 7, wherein hydrocarbon solvents having 6 to 12 carbon atoms and alcohol solvents having 4 to 10 carbon atoms are used as the organic solvent either-alone or in combination.

9. The process for preparing the porous resin according to claim 6, wherein the vinylbenzyloxyalkyl derivative is a derivative of the formula (1) wherein A represents a halogen atom.

10. The process according to claim 9, wherein hydrocarbon solvents having 6 to 12 carbon atoms and alkyl halide solvents having 3 to 12 carbon atoms are used as the organic solvent either alone or in combination.

* * * * *